Oct. 8, 1968 C. R. STELLJES 3,404,574
VIBRATION DAMPING MECHANISM
Filed June 13, 1966
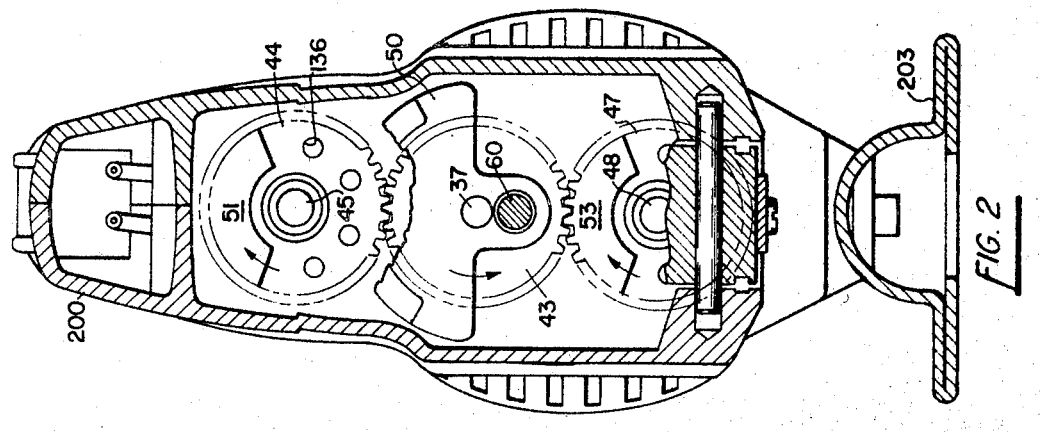
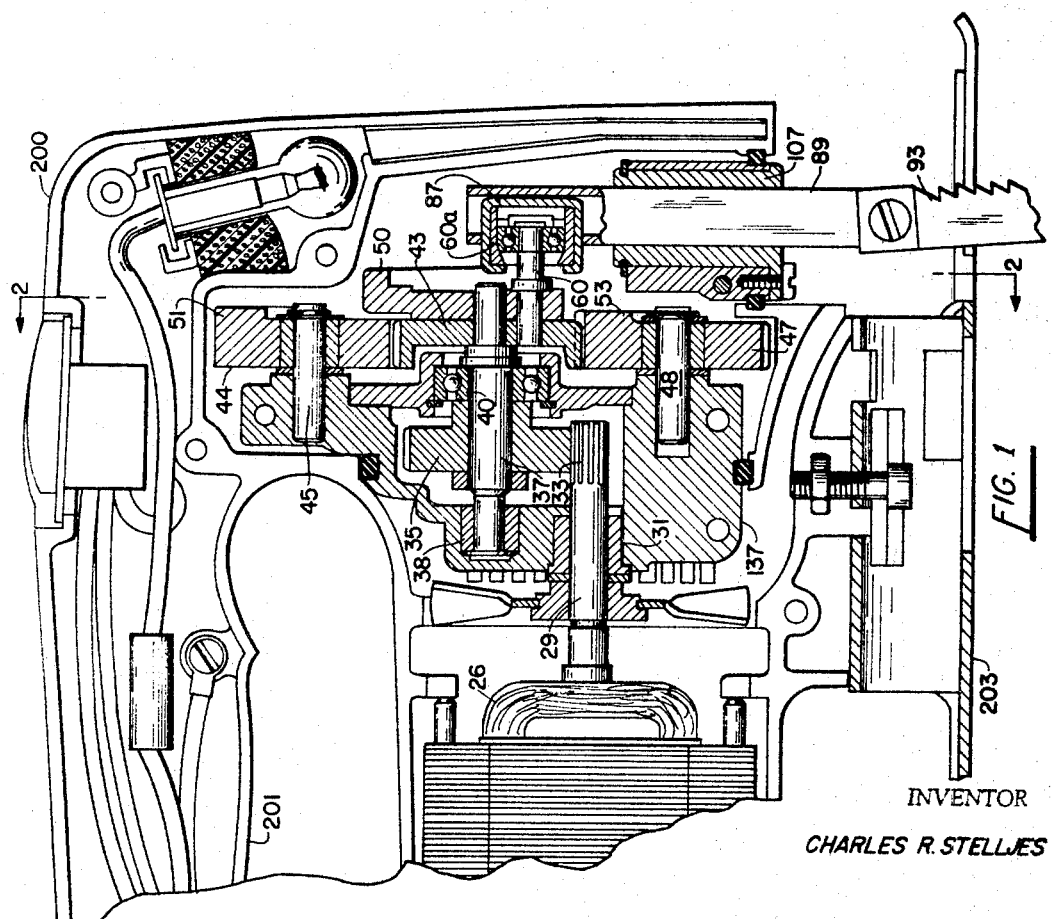
INVENTOR
CHARLES R. STELLJES
BY
Strauch, Nolan, Neale, Nies & Bronaugh
ATTORNEYS

United States Patent Office 3,404,574
Patented Oct. 8, 1968

3,404,574
VIBRATION DAMPING MECHANISM
Charles R. Stelljes, Fayetteville, N.Y., assignor to Rockwell Manufacturing Company, Pittsburgh, Pa., a corporation of Pennsylvania
Filed June 13, 1966, Ser. No. 557,289
2 Claims. (Cl. 74—50)

ABSTRACT OF THE DISCLOSURE

A vibration damping mechanism for a circular to reciprocating-rectilinear movement converting mechanism of a portable power tool including a reciprocating tool carrying rod and a drive pinion mounted for rotation in a plane parallel to and to one side of the line of travel of the reciprocating tool carrying rod on the end of a drive shaft journalled for rotation on an axis normal to the line of travel of the reciprocating tool carrying rod. The vibration damping mechanism, a three stage counterweight mechanism with the axes of rotation of the several stages disposed in vertically spaced relation in a common plane containing the line of travel of the reciprocating tool carrying rod, is arranged to operate between the drive pinion and the tool carrying rod with the counterweights moving in substantial coplanar directional unison oppositely with respect to the reciprocating mass of the tool carrying rod and tool and providing a mass or weight sufficient to dynamically counterbalance the reciprocating mass without creating torsional forces of the type present in two stage damping systems or three stage nonplanar weighted damping systems of the prior art.

Summary of the invention

This invention pertains to a vibration damping mechanism for reciprocating structures of portable power tools and the like, and particularly to vibration suppression in a hand held motor driven saber saw.

The need for suppressing vibration in reciprocating, power hand saws is universally recognized in the art, and a number of diverse counterbalancing schemes have been used with varied degrees of success. The more elementary practice is to counterbalance the crank drive which reciprocates the cutting tool structure, so that it absorbs the dynamic unbalance due to movement of the latter. An example of such construction will be found in Enders, Patent No. 3,206,989, of Sept. 21, 1965, entitled, "Arcuate Motion Jig Saw," as well as the inventor's prior, joint patent, Stelljes et al., No. 3,095,748 for "Orbital Motion Tool." This approach, however, creates lateral vibrations of the tool inasmuch as there is nothing to counterbalance the assembly as the mass of the crank drive shifts from side to side, perpendicularly to direction of tool reciprocation.

Some compensation for this unbalance is obtained by two stage counterbalancing structures of the type disclosed in Osterwald, Patent No. 2,501,631 where in addition to the normal counterweight on the crank structure, there is a second vertically aligned counterweight member, driven in unison with the crank, but in opposite direction therefrom. In this type of vibration suppression, the oppositely rotating counterweights tend to suppress bodily vibration of the cutting end of tool, but they create a torsional vibration tending to twist the same about an axis perpendicular to the line of tool reciprocation.

Various further refinements have been attempted in the prior art, among them assignee's four stage system disclosed in Patent No. 3,205,721, to J. R. Speer of Sept. 14, 1965, entitled, "Saber Saws."

The present invention seeks to solve the problem of vibration along vertical and horizontal planes, as well as torsional vibration effects, by utilizing a three stage vibration damping system. This system does not add excess weight nor materially increase space requirements, yet it smooths out vibration to a superior degree, and contributes to better handling and improved cutting accuracy of the hand tool.

A three stage counterbalancing structure resembling, superficially, the vibration suppressing arrangement of the invention is disclosed in a steam locomotive drive organization Patent to Langer, No. 2,432,907, of Dec. 16, 1947, entitled "Balancer." The patent system however dealt with a totally different problem (keeping locomotive wheels from jumping the track), and was not used to counterbalance linear reciprocation of a tool system produced by a motor driven crank.

Briefly, it is the object of this invention to provide an improved vibration suppressing structure in a crank operated, high speed, reciprocating tool wherein substantial unbalance is introduced by the crank mechanism itself and by the high inertia generated by the reciprocating tool carrying rod, the crosshead guide thereon and by the tool (saw blade) carried thereby.

Brief description of drawings

The invention will become more fully apparent from the claims and the description as it proceeds in connection with the drawings wherein:

FIGURE 1 shows a partial, sectional view of a saber saw utilizing the present invention.

FIGURE 2 is a front elevation along line 2—2 of FIGURE 1, showing the crank, and the counterbalance mechanism.

Description of preferred embodiment

This invention is applicable to a variety of hand tools, and its utilization in a saber saw construction is disclosed in assignee's copending applicaton Ser. No. 498,215, filed Oct. 20, 1965, in the name of H. K. Leach et al. for a "Tool." The reference numerals used therein are largely followed in this description.

FIGURE 1 illustrates the general arrangement of the forward, cutting tool, half of the saber saw of the aforesaid copending application. For purposes of this disclosure it will suffice to point out that the drive for the reciprocating tool of the invention is transmitted from electric motor 26 through shaft 29 supported in bearing 31, pinion 33, gear 35, spindle 37 to pinion 43. Gear 35 and pinion 43 are fixed on spindle 37 and the latter is mounted in bearings 38 and 40, as seen in FIGURE 1.

The saw comprises a generally rectangular narrow casing 200 including a handle 201 at the top thereof and a guide shoe 203 at the bottom. The cutting blade 93 is mounted for reciprocation at the very front, leading end of the tool (as shown in FIGURE 1); it extends through and below the shoe to contact a work piece.

Pinion 43 has a crank pin 60 and counterweight 50 fixed thereon, and meshes with adjoining pinions 44 and 47 above and below said pinion. Spindle 37 extends from an enclosed gear box 137, which latter has mounting studs 45 and 48 extending therefrom. Studs 45 and 48 support (through suitable bushings) pinions 44 and 47 for rotation thereon about axes parallel to the axis of rotation of pinion 43. The rotation axes of studs 45 and 48 and of spindle 37 lie on a common plane paralleling the line of reciprocation of tool rod 89.

Tool rod 89 is square in cross section and slidably and non-rotatably mounted in bearing 107. At its bottom end (FIGURE 1), rod 89 is provided with suitable means for interchangeably mounting a selected saw blade 93, while at its top it carries a crosshead guide 87 which cooperates with crank pin 60 through a suitable slider and bearing arrangement, the details of which are not pertinent to this invention. Thus, the total reciprocating mass which needs dynamic counterbalancing, consists of rod 89, crosshead guide 87, the slider and bearings therein, pin 60 and saw blade 93.

Referring to FIGURE 2, it will be observed that the counterweight carried by pinion 43 comprises, a flat, semi-circular member, somewhat larger in diameter than the pinion with its mass properly proportioned and sufficiently off center to provide the major counterbalance for the reciprocating mass referred to above.

The two outer pinions 44 and 47 are of like weight and construction. The counterbalancing weights 51 and 53 are integral parts of the pinions 44 and 47, off center masses being attained by making these pinions of thick blanks and cutting away eccentric portions thereof so as to leave raised segments 51 and 53, as shown in the figures. To augment the unbalance (counterweight effect) of the pinions, holes 136 are drilled in the semicircular portions thereof opposite segments 51 and 53.

In operation, with the three gear assembly being driven by the motor at a high rate of speed and reciprocating saw blade 93 through crank pin 60, crosshead 60a and crosshead guide 87, etc., center counterweight 50 rotates in one direction, while counterweights 51 and 53 rotate in an opposite direction (see arrows in FIGURE 2). Thus the latter counterweights tend to oppose and balance the latent forces set up by the center counterweight and dampen lateral vibration of the hand tool about a vertical axis through spindle 37 and studs 45 and 48 while augmenting the vertical effect of counterweight 50 in opposing the forces generated by the tool carrier 49 and related components.

Moreover, since counterweights 51 and 53 are of equal mass and are equidistant from the spindle 37 about which counterweight 50 rotates, their counterbalancing effect is applied without creating torsional forces of the type present in the two stage damping systems of the prior art.

Even though the counterweights rotate in opposite directions, their bodily displacement up and down is in unison; that is, they all move generally upward, or generally downward (FIGURE 2) together. Thus, all three counterweights serve to counterbalance the forces set up by the reciprocating mass of the tool carrier 89, crosshead guide 87 and tool 93, which at any given movement move in a vertical direction opposite to that of the counterweights.

It will be noted that the coplanar counterweights are maintained in fixed angular relation on the adjoining intermeshing pinions so that they will clear each other in operation of the device. The exact weights and spacing of counterbalancing elements of the system may be calculated mathematically through moment of forces equations, or they may be derived empirically in a manner familiar in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a portable power tool or the like, having a circular to reciprocating-rectilinear movement converting mechanism having a power actuated driving crank pinion and a substantially linearly reciprocating means connected to and driven thereby, a three stage dynamic vibration damping mechanism, including said driving crank pinion, having respective axes of rotation disposed in a common plane containing the line of travel of said linearly reciprocating means and arranged to operate in a plane substantially parallel to the line of travel of said reciprocating means, the driving crank pinion having a counterweight mounted eccentrically thereon to operate between said substantially parallel plane and said reciprocating means and the other two stages comprise respective rotatable counterweighted pinions the counterweights of which lie in a common plane with the counterweight of said driving crank pinion.

2. A vibration damping mechanism according to claim 1, wherein all said counterweights are mounted on the faces of said respective pinions to move simultaneously in one direction in said last mentioned common plane, said one direction being opposite to the direction of travel of said reciprocating means at any given instant.

References Cited

UNITED STATES PATENTS

| | | | |
|---|---|---|---|
| 672,320 | 4/1901 | Ford | 74—50 X |
| 3,205,721 | 9/1965 | Speer | 74—50 |
| 3,205,722 | 9/1965 | Happe | 74—50 |

DONALD R. SCHRAN, *Primary Examiner.*